United States Patent [19]

Magnuson

[11] Patent Number: 5,152,582
[45] Date of Patent: Oct. 6, 1992

[54] SELF-ALIGNING FASTENER SYSTEM HAVING STUD-ENGAGING RESILIENT LEGS

[75] Inventor: Richard C. Magnuson, Kentwood, Mich.

[73] Assignee: American Seating Company, Grand Rapids, Mich.

[21] Appl. No.: 676,661

[22] Filed: Mar. 28, 1991

[51] Int. Cl.$^5$ .............................................. A47E 7/00
[52] U.S. Cl. .................................. 297/440; 297/454; 297/444; 411/111; 411/970
[58] Field of Search .............. 297/455, 456, 218, 219, 297/440, 441, 452; 248/503.1; 411/111, 970, 517, 349, 456, 451, 510, 182, 913, 918, 112, 453, 388, 389; 24/293, 325, 327, 661, 662, 453, 295

[56] References Cited

U.S. PATENT DOCUMENTS

| | | | |
|---|---|---|---|
| 1,646,367 | 10/1927 | Carr | 411/970 X |
| 1,885,204 | 11/1932 | Johnson | 411/451 X |
| 2,078,453 | 4/1937 | Miller | 411/517 X |
| 2,303,148 | 11/1942 | Tinnerman | 411/111 |
| 2,552,066 | 5/1951 | Sorensen | 411/349 |
| 2,741,938 | 4/1956 | Johnson | 411/510 X |
| 2,926,409 | 3/1960 | Perry | 411/517 X |
| 3,873,155 | 3/1975 | Baraceki | 297/455 X |
| 3,893,211 | 7/1975 | Skinner | 411/349 |
| 4,863,327 | 9/1989 | Poupiter | 411/112 |
| 5,035,559 | 7/1991 | Nilsen | 411/456 X |

FOREIGN PATENT DOCUMENTS

2630333  1/1978  Fed. Rep. of Germany ... 248/503.1

Primary Examiner—Kenneth J. Dorner
Assistant Examiner—James M. Gardner
Attorney, Agent, or Firm—Dykema Gossett

[57] ABSTRACT

A self-aligning fastener system incorporates a stud member fastened to a first member and a female member attached to a second panel member for fastening the first member to the panel member. The female member includes a head portion which spans an aperture of the panel and has an aperture therethrough, the head portion includes leg portions which depend from the head portion which extend through the panel aperture and are engaged by a clip on the opposite side of the panel for retaining the female fastener in the aperture. The panel aperture and leg spacing are dimensioned such that the female fastener is adapted to move along a first axis of said aperture thereby allowing the female fastener to accommodate any alignment errors between itself and the stud fastener along the first axis. The leg portions of the female fastener have a pair of linear engagement surfaces arranged perpendicular to the first axis whereby the leg portions can engage and retain the stud member anywhere along their length. This feature allows the fastener to accomodate alignment errors along a second axis perpendicular to the first axis. The fastening system is also disclosed for use in a seat shell and seat insert assembly.

11 Claims, 4 Drawing Sheets

SELF-ALIGNING FASTENER SYSTEM HAVING STUD-ENGAGING RESILIENT LEGS

BACKGROUND OF THE INVENTION

This invention relates generally to fasteners and particularly relates to fasteners which are used to fasten two members together wherein at least one of the members is accessible from both sides.

Many fastener designs exist and can generally be segregated into two categories—fasteners which must operate in environments wherein the fastener is not accessible from one of its sides and fasteners which can be accessed from both sides. The former calls for a fastener such as a pop rivet, a wood screw or any other fastener which can be manipulated from one, and only one, of its ends to accomplish its fastening task. The latter type fastener includes a traditional nut and bolt and the like.

In applications where it is desirable to join a member to a panel, wherein the panel is accessible from both sides, it is often desirable to use a fastener which floats or is otherwise movable within a panel aperture. This floating feature is particularly desirable when both halves of the fastener must be initially fastened to their respective members which themselves are fixed, or aligned with one another, in a predefined relationship (such as by a hinge or the like). In such cases, if the members are not perfectly pre-aligned the fastener halves will not properly mate when brought together for fastening. This precise pre-alignment is unnecessary if one of the fasteners is free to float thereby aligning itself with its mating half when the two are brought together.

It is also desirable to have a fastener which can be connected and disconnected to and from its respective mating half without necessitating the use of specialized tools. This is particularly relevant in applications where a portion of the fastener is difficult to access or where frequent fastening and unfastening is common (such as fasteners used on doors, etc.). Fasteners which can be released by hand also have the additional benefit of reducing maintenance time/cost where the fastener is used in an environment where a skilled technician or the like must first separate members joined together by the fastener to access an item to be serviced.

It is also desirable, in some applications, to have a fastener which possesses a plurality of locking positions. Such a fastener may be used in applications where the thickness of material located between the two fastener halves is uncertain or subject to wide variation. Further, it is often desirable to have a fastener with replaceable parts, especially those parts which tend to wear quickly. In such a case, if the wear prone parts are field replaceable, they can be serviced in the field. In cases where the fastener is not constructed with serviceable parts, the entire fastener, or perhaps the fastener and associated members, must be removed and discarded and a new ones installed.

It is an object of this invention to provide a self-aligning fastener which floats within a panel opening to thereby accommodate misalignments between the panel and the member to be fastened thereto.

It is also an object of this invention to provide a fastener which fastens and unfastens with simple hand tools.

It is yet an additional object of this invention to provide a fastener which has field replaceable components, especially those components which are prone to wear.

It is still a further object of this invention to provide a fastener which can be used to fasten a seat insert to a seat shell which has the above features.

SUMMARY OF THE INVENTION

In light of the foregoing objects, the present invention provides a self-aligning fastener system for attaching a first member to a second member, the second member having first and second generally planar faces wherein the faces are generally parallel, and an aperture communicating between the faces. The fastener system comprises a stud member having one end adapted to be attached to a first member and a second end extending from said member, a female member having a head portion having an aperture therethrough and two spaced apart resilient leg portions extending away from the head portion, the leg portions each having a stud engaging end and a retaining washer engaging end, the head portion adapted to span the aperture of the second member, and a retaining washer having first and second sides and an aperture communicating therebetween, the retaining washer adapted to span the aperture of the second member, whereby when the first side of the retaining washer is brought in contact with the first face of the second member such that the aperture of the retaining washer and the plate member are generally aligned, and whereby when the legs of the female member are inserted into the retaining washer aperture from the second face side of the second member, the resilient legs engage the retaining washer and are inwardly compressed toward one another and whereby when the compressed legs are pushed therethrough, the female member head portion engages the second face of the second member thereby preventing further insertion of the female member into the aperture of the second member, and the retaining washer engaging end of each leg passes completely through the retaining washer aperture thereby being released from their compressed position and causing the retaining washer engaging end of each leg to engage the second side of the retaining washer thereby retaining the female fastener in the aperture of the second member, and wherein the distance between the leg portions proximal the head portion is sufficiently small along a first axis to allow the female member to move along the first axis within the aperture of the second member in a plane parallel to the first and second parallel faces of the second member, and whereby the stud engaging end of each leg is adapted to engage and bear resiliently against the body portion of the stud member after the second end of the stud member is passed through the apertures of the female fastener head portion, the second member and the retaining washer, and whereby any substantial imbalance along the first axis between the resilient forces of the legs against the body portion of the stud will act to move the female fastener within the second member aperture along the first axis in a manner which tends to balance the resilient forces exerted by the legs against the stud body, thereby aligning the female member with the male member, and whereby the engagement between the legs and the stud member retains the first member to the second member.

In a preferred embodiment, the stud engaging end portion of the legs is defined by a linearly extending surface, the axes of the linear surfaces are generally perpendicular to the first axis, and parallel to one another, the linearly extending surfaces allowing the stud body to be inserted anywhere along the length of the linear surface thereby accommodating misalignment between the stud member and the female member along an axis perpendicular to the first axis.

In a second aspect, the present invention provides a seat insert fastening system, for fastening an insert to a seating portion of a seat shell. The seat insert fastening system comprises a seat shell for supporting a user, the shell having an engaging surface, and an inner portion defined by an inner surface, the engaging surface and the inner surface connected by way of an aperture extending therebetween, a seat insert adapted to generally conform to the contour of the seat engaging surface of the seat shell, a stud fastener attached to the seat insert and having an elongated body portion extending from a surface of the seat insert, a female fastener having a head portion adapted to span the seat shell aperture thereby preventing the fastener from passing through the seat shell aperture and into the inner portion of the seat shell, the head portion of the female fastener having an aperture therethrough and two spaced apart, resilient leg portions extending therefrom in a common direction and encircling a longitudinal axis of the aperture of the head portion, the resilient legs adapted to engage the stud body and resiliently retain the stud body therebetween, the female fastener adapted to engage the seat shell in the vicinity of the seat shell aperture such that the head portion engages the engaging surface of the seat shell and spans the seat shell aperture, wherein the leg portions extend through the seat shell aperture and into the inner portion of the seat shell, the leg portions spaced apart relative to the seat shell aperture such that the female fastener is permitted to move within the seat shell aperture along a first axis parallel to the engaging surface of the seat shell, a retaining member adapted to reside in the inner portion of the seat shell and engage the legs of the female fastener thereby preventing the female fastener from being pulled out of the seat shell aperture, the retaining member allowing the female fastener to move along the first axis, whereby when the seat insert is placed adjacent the seat shell and the stud fastener is passed through the female fastener aperture and between the resilient legs, and whereby any substantial imbalance along the first axis between the resilient forces of the legs against the stud body will cause the female fastener to move along the first axis in the direction which substantially balances the resilient forces exerted by the legs on the stud body, thereby aligning the female fastener with the male fastener, and whereby the engagement of the legs and the stud body acts to fasten the seat insert to the seat shell.

In a preferred embodiment the resilient legs of the female fastener include a linearly extending stud engaging surface, the linear surfaces having axes generally perpendicular to the first axis, and parallel to each other, the linear extending surfaces allowing the stud to be inserted between the linear surfaces anywhere along their length, thereby accommodating misalignment between the stud fastener and the female fastener along an axis perpendicular to the first axis.

Other advantages and meritorious features of the present invention will become more fully understood from the following description of the preferred embodiments, the appended claims and the drawings, a brief description of which follows.

DETAILED DESCRIPTION OF THE PREFERRED EMBODIMENTS

Figures 1, 2:
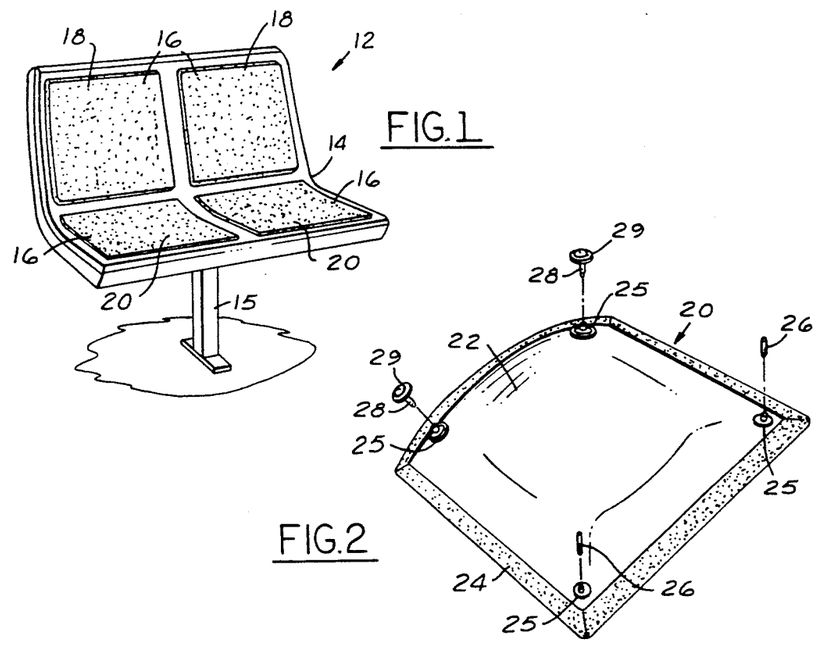
FIG. 1 is an isometric drawing of a seat shell having four seat inserts assembled thereto, the entire assembly being supported by a single pedestal.
FIG. 2 is an isometric view of a bottom surface of one of the seat inserts of FIG. 1.

Now referring to FIG. 1, seat 12 comprises seat shell 14, seat shell pedestal 15 and inserts 16. Two types of inserts 16 are presented—back inserts 18 and bottom inserts 20. Although seat 12 is of the style generally associated with public transportation, its purposes are illustrative only, and the disclosed invention is in no way limited thereby.

Now referring to FIG. 2, seat bottom 20 is comprised of rigid panel 22 covered by fabric 24. Rigid panel 22 can be comprised of any number of materials such as metal, wood, plastic or the like, the preferred material being fiberglass. Fiberglass panel 22 is generally adapted to conform to the contour of seat shell 14 in the area where panel 22 engages seat shell 14. The underside of the insert 20 is fitted with four threaded T-nuts which are preferably embedded in the fiberglass resin before hardening, thereby becoming firmly integrated with the fiberglass panel after the resin has set. The two forward connectors 26 are male stud type fasteners which have threads at one end to threadedly engage T-nuts 25. The two rearward connectors 28 are two conventional threaded bolts having oversized washers 29. Although T-nuts 25, bolts 28 and oversized washers 29 are standard components, stud fasteners 26 make up one-half of the disclosed fastening system of the present invention. The operation of stud fasteners 26 in conjunction with their associated mating half will be explained in conjunction with the remaining figures.

Figure 3:
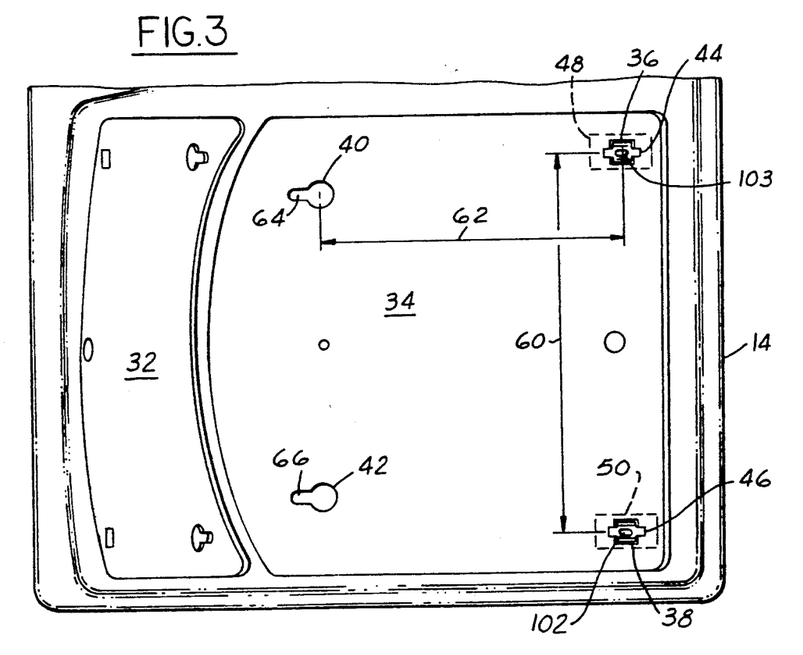
FIG. 3 is a top plan view of the left hand seat portion of the seat shell of FIG. 1, absent the seat inserts.

Now referring to FIG. 3, a top view of the left hand seating portion of seat shell 14 comprises a plastic housing having a back insert engaging surface 32 and a bottom insert engaging surface 34. Surfaces 32, 34 have various seat insert apertures which communicate between surfaces 32, 34 and an inner hollow portion of seat shell 14 defined by an inner surface thereof (inner portion of seat shell 14 and inner surface thereof not visible in FIG. 3). Focusing on bottom insert engaging surface 34, two forward apertures 36, 38 communicate between bottom insert engaging surface 34 and seat shell 14 inner surface (not shown). Two rearward apertures 40, 42 likewise communicate between bottom insert engaging surface 34 and seat shell inner surface (not shown). Apertures 40, 42 directly engage oversized washers 29 thereby fastening the rearward portion of bottom insert 20 to seat shell 14. Forward apertures 36, 38 are adapted to receive female fastener portion 44, 46. Female fastener portions 44, 46 are held in their respective apertures 367, 38 by respectively associated retaining clips (or washers) 48, 50. As will be discussed in more detail hereafter, female fasteners 44, 46 are adapted to engage a respectively associated stud fastener 26 to fasten the forward portion of seat insert 20 to seat shell 14. This fastening operation, along with advantages thereof, will now be discussed in conjunction with FIGS. 4 through 9.

Figure 4:
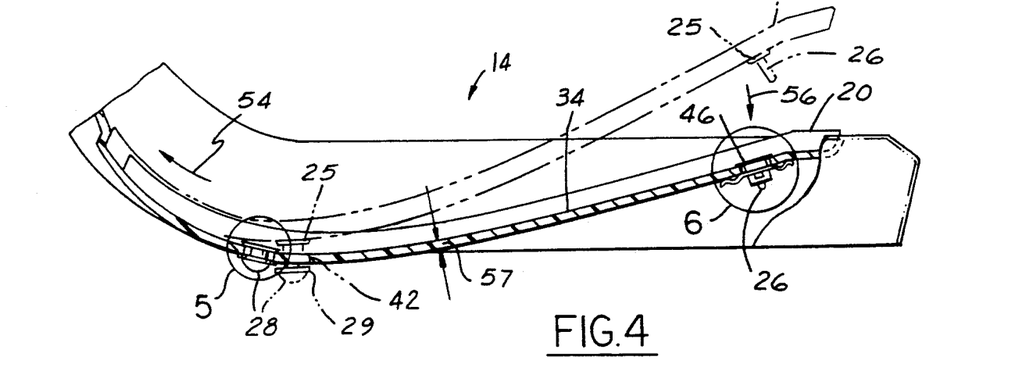
FIG. 4 is a cross-sectional view of a bottom seat insert in relation to a seat shell.

Now referring to FIG. 4, seat shell 14 is adapted to engage and retain seat insert 20 along its seat engaging surface 34. Seat insert 20 is fastened to seat shell 14 in the following manner. Threaded bolts 28 are fitted with oversized washer 29 and threaded into their respective T-nuts 25. Sufficient gap 52 (see FIG. 5) is left between oversized washer 29 and bottom insert 20 so that the thickness 57 of seat shell 14 can be accommodated therebetween. Additionally, studs 26 are threaded into their respective T-nuts 25 until they bottom out therein. Next, bottom insert 20 is positioned over bottom insert engaging surface 34 such that bolts 28 and oversized washers 29 extend through their respective rearward apertures 40, 42 (only aperture 42 visible in FIG. 4). After this positioning is accomplished, seat insert 20 is slid upwardly 54 thereby engaging the shanks of bolts 29 with the narrow slotted portion 64, 66 of rearward apertures 40, 42 (rearward apertures of 40, 42 are not visible in FIG. 4 but see FIG. 3). While sliding seat insert 20 rearwardly 54, studs 26 are lowered 56 and inserted through central aperture 102, 103 (see FIG. 3) of their respective female fasteners 44, 46 (female fastener 44 not visible in FIG. 4).

When the above-described maneuver is completed, the two oversized washer and bolt assemblies 28, 29 securely retain the rearward portion of bottom insert 20 in seat shell 14 and the cooperative engagement between studs 26 and their respective female fasteners 44, 46 acts to securely retain the forward portion of seat insert 20 to seat shell 14. It is important to note that once threaded bolts 28 are engaged in the respective elongated slot portions 64, 66 of their respective apertures 40, 42, the forward and rearward movement 54 of bottom insert 20 is somewhat limited. Accordingly, if studs 26 and their respective female fasteners 44, 46 were constructed from conventional fasteners their relative positioning within bottom insert 20 would have to be kept to a very close tolerance in order for male fasteners 26 to align with their female counterparts 44, 46. If this tolerance is not kept fairly close, it is easy to see that studs 26 may not both align with their respective female fasteners 44, 46. The alignment consideration is even more critical when considering the alignment tolerances between the two female fasteners 60 (see FIG. 3). It is believed that if conventional female fasteners were used in the place of female fasteners 44, 46 of the present invention, tolerance between female fasteners 60 would be even more critical than tolerance 62. This is thought to be the case because with tolerance 62, at least there is the elongated slot which can take up some misalignment between bolt 29 and aperture 40 and stud 26 and female fastener 44. However, along distance 60 there is no conventional slot to take up any misalignment. Thus, a conventional fastener would require that alignment between bolts 28 and studs 26 with respect to their respective aperture be kept to close tolerances. However, with the self-aligning (or floating) fasteners of the present invention, the aforementioned tolerances can vary quite extensively and still fall within the permissible range. This floating feature of the present invention will now be explained in conjunction with the subsequent figures.

Figure 5:
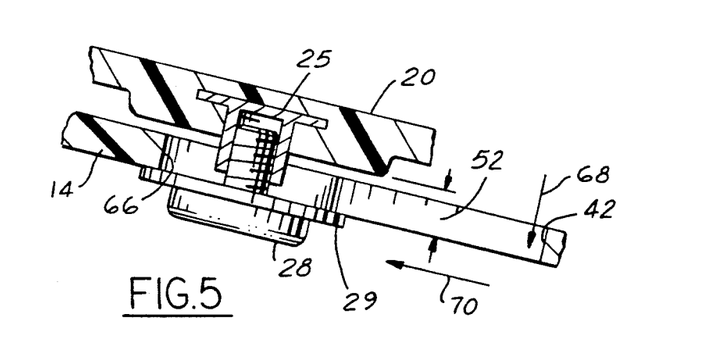
FIG. 5 is an enlarged view of the area substantially within the electrical portion referenced as 5 in FIG. 4.

Now referring to FIG. 5, threaded bolt 28 is of the conventional type and is adapted to engage the threads of its respectively associated T-nut 25. T-nut 25 embodied in the fiberglass resin of bottom insert 20 before the resin hardens. This process allows an excellent bond between T-nut 25 and fiberglass insert 20. Bolt 28 is threaded into T-nut 25 leaving sufficient distance 52 between washer 29 and insert 20 so that oversized washer 29 and bolt 28 can be inserted 68 through aperture 42 and pushed up into 70 elongated slot portion 66 of aperture 42.

Figure 6:
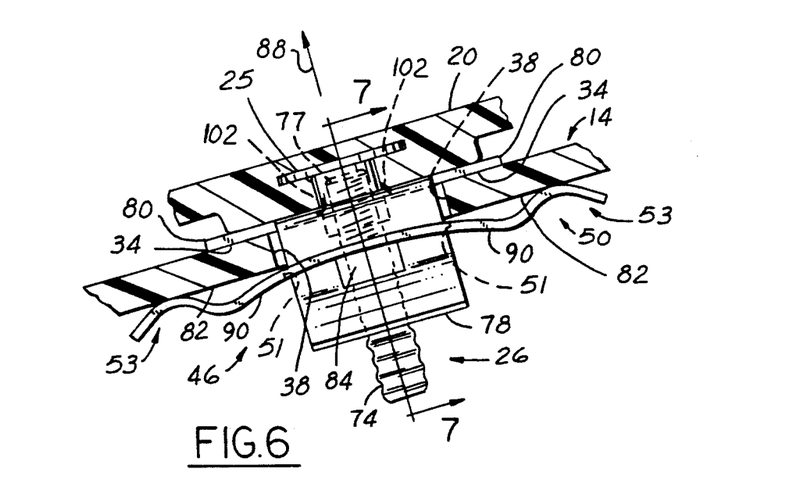
FIG. 6 is an enlarged view of the area substantially within the encircled portion referenced as 6 in FIG. 4.

Now referring to FIG. 6, bottom insert 20 is fitted with T-nut 25. Stud fastener 26 has a first end 72 which engages the threads of T-nut 25. Second end 74 of stud 26 is generally rippled and extends through center aperture 102 of female fastener 46, aperture 38 of seat shell 14, aperture 51 of washer 50 (or retainer) and between resilient legs 76, 78 of female fastener 46 (resilient leg 78 not visible in FIG. 6). Female fastener 46 has a head portion 80 which spans shell aperture 38. This prevents fastener 46 from falling through aperture 38 and into the inner portion of seat shell 14. Seat shell 14 has an engaging surface 34 and an inner surface 82. Washer 50 retains female fastener 46 within aperture 38 by engaging spurs (or fingers) 84, 86 located along resilient leg portions 76, 78 of female fastener 46. Washer 50 preferably includes curved end portions 53 for urging said head 80 of female fastener 46 against insert engaging surface 34. This urging prevents female fastener 46 from separating from washer 50, such as might be the case in high vibrational environments. Of course some parts could be consolidated by directly molding stud 26 into fiberglass insert 20 or, alternatively, stud 26 could be designed with a head which could be projection welded to panel 20, if panel 20 was comprised of a metal suitable for welding.

An upward force 88 of sufficient urging on bottom insert 20 will cause stud fastener 26 to separate from female fastener 46. However, this urging will not cause female fastener 46 to dislodge from shell aperture 38 by virtue of the fact that spurs 84, 86 lockingly engage outer surface 90 of washer 50 thereby forcing washer 50 against inner surface 82 of seat shell 14. The floating, or self-aligning feature of the disclosed fastener of the present invention will now be explained in conjunction with FIGS. 7 and 8.

Figures 7, 8, 9:
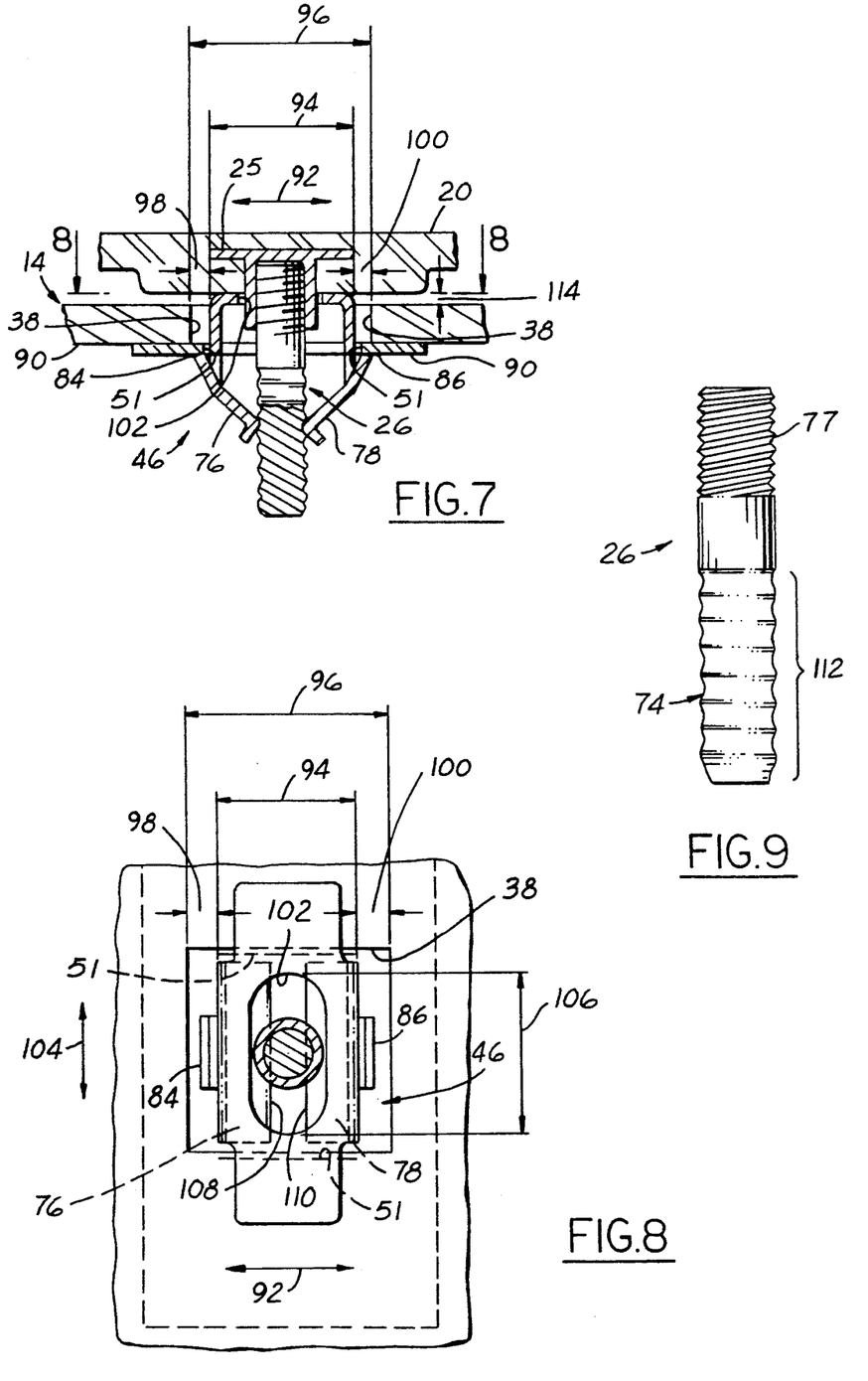
FIG. 7 is a cross-sectional view taken substantially along lines 7—7 of FIG. 6.
FIG. 8 is a cross-sectional view taken substantially along lines 8—8 of FIG. 7.
FIG. 9 is a front view of the stud fastener of the present invention.

Now referring to FIGS. 7 and 8, female fastener 46 is movable along a first axis 92 by virtue of the fact that the distance 94 between resilient legs 76, 78 is less than opening 96 of aperture 38 along first axis 92. This dimensional difference between aperture 38 and resilient leg spacing 94 gives rise to tolerance gaps 98, 100. Gaps 98, 100 define the permissible range in which female fastener 46 may float along axis 92 in order to accommodate any misalignment between insert 20 and aperture 38 of shell 14.

In addition to accommodating misalignments along axis 92, the fastener of the present invention can also accommodate misalignments along axis 104, which is perpendicular to axis 92. This feature of the present invention will now be explained. Any misalignment which occurs between female fastener 46 along axis 104 is accommodated by the fact that stud 26 can be inserted through aperture 102 anywhere along its permissible length 106. Accordingly, resilient leg portions 76, 78 include linearly extending stud engaging surfaces 108, 110. Each surface 108, 110 is generally curved and can be modeled as being constructed from a plurality of parallel, adjoining lines, hence surfaces 108, 110 are hereby defined as curvalinear surfaces. Each curvalinear surface 108, 110 has a longitudinal axis defined by a line parallel to the hypothetical parallel lines which make up surfaces 108, 110. The longitudinal axis of each curvalinear surface 108, 110 is generally perpendicular to axis 92 and generally parallel to one another. Linear extending stud engaging surfaces 108, 110 allow stud 26 to be retained anywhere along length 106, thereby accommodating misalignment between the stud fastener aperture 38 along second axis 104.

Now referring to FIG. 9, stud 26 is designed with first threaded end 76 and second rippled end 74. It is important to note that because ripples 112 extend along a substantial portion of the length of stud fastener 26, stud portion 112 can be inserted between resilient legs 76, 78 at any number of positions along its rippled shaft. This feature allows the fastener system of the present invention to accommodate a wide range of variance in gap 114 (see FIG. 7) between seat insert 20 and seat shell 14. Accordingly, variation in fabric used to cover insert 20 or other inserted objects (such as panels or the like) can be easily accommodated by the disclosed fastener.

The method of installing the disclosed fastener will now be discussed in conjunction with FIGS. 4, 6 through 8. As has already been mentioned, before assembling insert 20 to shell 14, studs 26 are threadedly inserted into T-nuts 25. Next, female fastener 46 is set into shell aperture 38 such that head 80 spans aperture 38 and engages seat shell engaging surface 34 in the vicinity of aperture 38. Because head 80 is sufficiently long to span aperture 38, female fastener 46 cannot pass through aperture 38. Resilient legs 76, 78 pass through aperture 38 and extend into inner portion of seat shell 14. While retaining female portion 46 in this position, aperture 51 of retaining clip 50 is placed around resilient legs 76, 78 and pushed thereon. This pushing force compresses legs 76, 78 towards one another until aperture 51 of retaining clips 50 passes over spurs 54 wherein the legs 76, 78 resiliently spring outwardly assuming their normal position and spurs 84 engage outer surface 90 of retaining clip 50 thereby preventing female fastener 46 from pulling out 88 of shell apertures 38. While washer 50 is retained by spurs 84, it can be seen that female fastener 46 will remain within shell aperture 38. The final step is to insert studs 26 over apertures 102 of their respective female fasteners 46. Once this alignment is accomplished, insert 20 is pushed down toward female fastener 46, 48 such that studs 26 engage the resilient legs 76, 78 of their respective fasteners and are retainingly engaged therein. Removal of seat insert 20 from shell 14 is accomplished by simply lifting seat insert 20 away from shell 14 wherein resilient legs 76, 78 release their grip on rippled shaft 74 thereby allowing insert 20 to be lifted away from seat shell 14 in reverse of the manner it was inserted thereto. It can be easily understood in reference to FIG. 7 that the engagement and withdrawal forces necessary to join and separate the two halves of the fastener of the present invention are controllable through the design of a number of factors, two of which are the design of resilient legs 76, 78 and the profile surface geometry between mating surfaces of stud 26 and surfaces 108, 110 of legs 76, 78. For example, the material thickness of the resilient legs could be increased or decreased to increase or decrease the retention forces exerted against stud 26. Also ripples 112 on stud 26 can be deepened or stud 26 could be made smooth to change the retention forces to fit the needs of a desired application.

Figure 10:
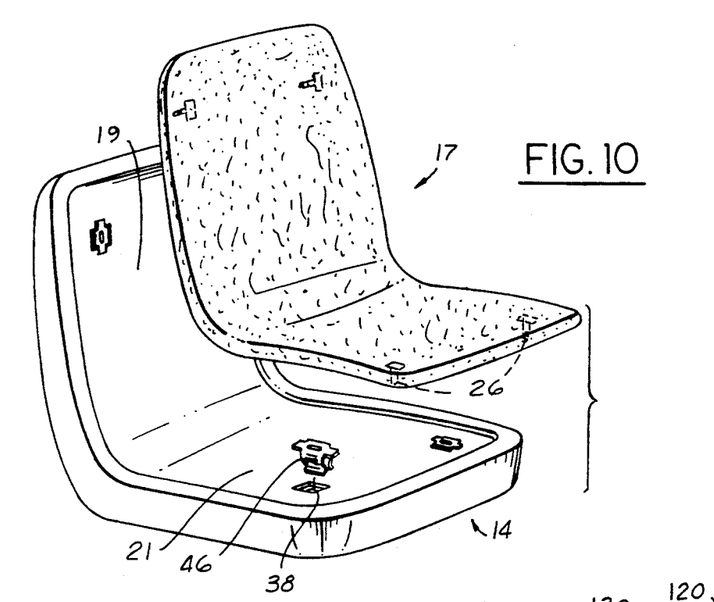
FIG. 10 is a perspective view of a seat shell having a single unit seat insert fastened thereto by way of the fastener system of the present invention.

Now referring to FIG. 10 of the drawings, a third embodiment of the present invention shows seat shell 14 having a single seat insert 17 which spans the back portion 19 and the bottom portion 21 of seat shell 14. Female fasteners (exemplified at 46) are adapted to cooperate with apertures (exemplified at 38) in a manner which has already been described in conjunction with the previous embodiments. Retaining clips (retaining clips not shown in this drawing) cooperate with female fasteners 46 in order to retain female fasteners 46 within their respective apertures 38. Stud type fasteners (exemplified at 26) are fixed to seat insert 17 and are adapted to engage their respective female fasteners 46 to thereby retain seat insert 17 to seat shell 14 in the identical manner to that which has previously been explained.

Figures 11, 12:
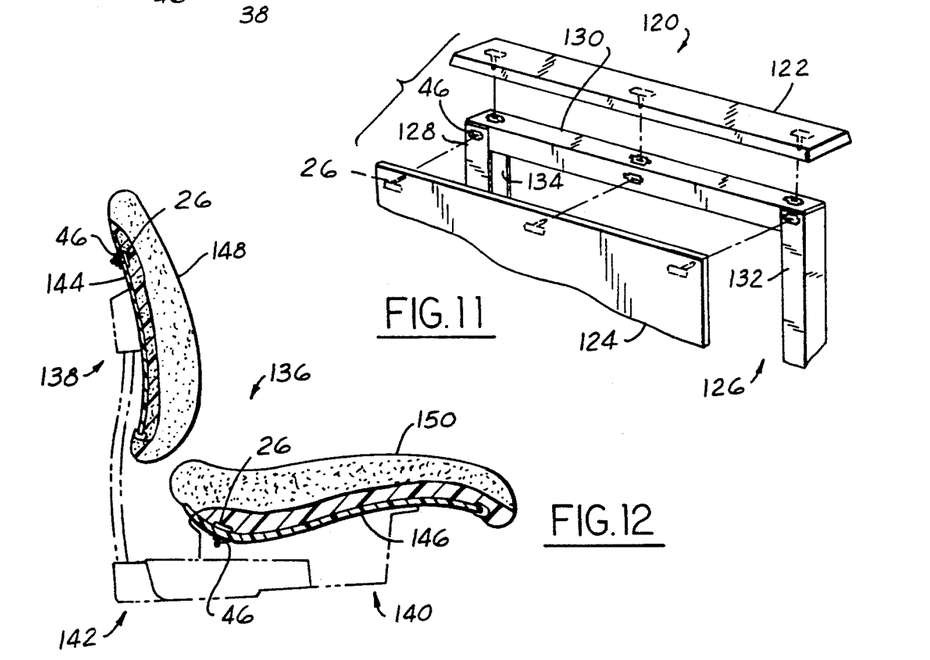
FIG. 11 is a isometric view of a divider panel employing the fastener system of the present invention.
FIG. 12 is a side view of a chair employing the fastener system of the present invention.

Now referring to FIG. 11, in addition to being applicable to seating systems, as has already been described, the fastener of the present invention is equally applicable to other applications such as office furniture systems (such as divider panels and the like). For example, divider panel 120 comprises two railing 122, filler panel 124 and rectangular frame 126. Rectangular frame 126 is comprised of "U" channel members 128, 130 and 132 which have at least one open side (exemplified at 134) where the washer (or retainer) which has previously been described (washer and retainer not shown in FIG. 11) may be slipped over resilient legs 78 (resilient legs 78 not shown) of female fasteners (female fasteners exemplified at 46). Male stud fasteners (exemplified at 26) are fastened along top railing 122 and filler panel 124 in positions which allow them to engage, and be retained by, a respectively associated female fastener 46. Thus it can be seen in the divider panel system of FIG. 11, that female fasteners 46 cooperate with frame 126 in a way which allows them to float therein, in precisely the same manner which has been heretofore explained. Likewise, male fasteners 26 are fastened to panel 124 and rail 122 in positions which allow them to engage a respective female fastener 46 thereby retaining rail 122 and panel 124 to frame 126.

Now referring to FIG. 2, chain 136 is comprised of back support 138, bottom support portion 140 and frame 142 which interconnects back support portion 138 and bottom support portion 140. Back support portion 138 includes back panel 144 and bottom support portions 140 includes bottom panel 146. Each respective panel 144, 146 is associated with a respective cushion 148, 150. Back cushion 148 is affixed to back panel 144 by way of the fastener system (26, 46) of the present invention. Likewise, bottom cushion 150 is affixed to bottom panel 146 by way of the fastener (26, 46) of the present invention. As has already been discussed in conjunction with the previous disclosure, the use of the fastener of the present invention, allows misalignments between stud 26 and female fastener 46 to be accommodated thereby eliminating the need for precision alignment between the placement of stud fastener 26 in cushions 148, 150 and the placement of female fastener 46 in panels 144, 146.

The foregoing detailed description shows that the preferred embodiments of the present invention are well suited to fulfill the objects of the invention. It is recognized that those skilled in the art may make various modifications or additions to the preferred embodiments chosen herein to illustrate the present invention, without departing from the spirit of the present invention. For example, the present fastener system has been disclosed with the female fastener portion floating and the male fastener portion fixed. It is understood that the roles of these two mating fasteners could be reversed in that the female fastener could just as easily be fixed within the fiberglass seat insert and the male fastener could float within the seat shell aperture. Also, although reference has been made throughout the text to the "insert" being fastened to the "seat shell", it is to be understood that the fastener of the present invention is not limited to use in any one particular application, but rather is truly a general purpose type fastener and, accordingly can be used, for example, for fastening a decorative panel to a wall divider frame (as shown in FIG. 11), a seat cushion to seat a frame (as shown in FIG. 12) or in any other application where a first member must be fastened to a second member, wherein the second member is accessible from both sides. Additionally, even though the preferred material for the female fastener is 0.025 SAE 1095 spring steel, it is to be understood that materials of comparable engineering function can be substituted therefor. Accordingly, it is to be understood that the subject matter sought to be afforded protection hereby should be deemed to extend to the subject matter defined in the appended claims, including all fair equivalents thereof.

I claim:

1. A self-aligning fastener system for attaching a first member to a second member, said second member having first and second generally planar faces wherein said faces are generally parallel, and an aperture communicating between said faces, said fastener system comprising:
   a stud member having first and second ends separated by a body portion, said first end adapted to be attached to and extend from said first member,
   a female member having a head portion having an aperture therethrough and two spaced apart resilient leg portions extending away from said head portion, said leg portions each having a stud engaging end and a retaining washer engaging end, said head portion adapted to span said aperture of said second member, and
   a retaining washer having first and second sides and an aperture communicating therebetween, said retaining washer adapted to span said aperture of said second member, whereby when said first side of said retaining washer is brought in contact with said first face of said second member such that said aperture of said retaining washer and said plate member are generally aligned, and
   whereby when said legs of said female member are inserted into said retaining washer aperture from said second face side of said second member, said resilient legs engage said retaining washer and are inwardly compressed toward one another and when said compressed legs are pushed therethrough,
   said female member head portion engages said second face of said second member thereby preventing further insertion of said female member into said aperture into said second member, and
   said retaining washer engaging end of said legs passes completely through said retaining washer aperture thereby being released from their compressed position and causing said retaining washer engaging end of each said leg to engage said second side of said retaining washer thereby retaining said female fastener in said aperture of said second member, and
   wherein the distance between said leg portions proximal said head portion is sufficiently small along a first axis to allow said female member to move along said first axis within said aperture of said second member in a plane parallel to said first and second parallel faces of said second member, and
   whereby said stud engaging end of each said leg is adapted to engage and bear resiliently against said body portion of said stud member after said second end of said stud member is passed through said apertures of said female fastener head portion, said second member and said retaining washer, and
   whereby any substantial imbalance along said first axis between said resilient forces of said legs against said body portion of said stud will act to move said female fastener within said second member aperture along said first axis in a manner which tends to balance the resilient force exerted by said legs against said stud body thereby aligning said female member with said male member and whereby said engagement between said legs and said stud member retains said first member to said second member.

2. The self-aligning fastener system of claim 1, wherein said body portion of said stud member is rippled.

3. The self-aligning fastener system of claim 1, wherein said retaining washer includes urging means for engaging said first face of said second member and urging said retaining washer away from said second member.

4. The self-aligning fastener system of claim 1, wherein said first end of said stud member is threaded and threadedly attached to said first member.

5. The self-aligning fastener system of claim 1, wherein said stud engaging end portion of said legs is defined by a linearly extending surface, each said linear surface having a parallel axis, said axes generally perpendicular to said first axis, and parallel to one another, said linearly extending surfaces allowing said stud body to be inserted anywhere along the length of said linear extending surfaces thereby accommodating misalignment between said stud member and said female member along an axis perpendicular to said first axis.

6. A seat insert fastening system, for fastening an insert to a seating portion of a seat shell, said system comprising:
   a seat shell for supporting a user, said shell having an engaging surface and an inner portion defined by an inner surface, said surfaces connected by way of an aperture extending therebetween,
   a seat insert adapted to generally conform to a contour of said engaging surface of said seat shell, a stud fastener attached to said seat insert and having an elongated body portion extending from a surface of said seat insert, a female fastener having a head portion adapted to span said seat shell aperture, thereby preventing said fastener from passing through said seat shell aperture and into said inner portion of said seat shell, said head portion having an aperture therethrough and two spaced apart, resilient leg portions extending therefrom in a common direction and encircling a longitudinal axis of said aperture of said head portion, said resilient legs adapted to engage said stud body and resiliently retain said body, said head portion of said female fastener adapted to engage said seat shell in the vicinity of said seat shell aperture such that said head portion engages said engaging surface of said seat shell and spans said seat shell aperture, wherein said leg portions extend through said seat shell aperture and into said inner portion of said seat shell, said leg portions spaced apart relative to said seat shell aperture such that said female fastener is permitted to move within said seat shell aperture along a first axis parallel to said engaging surface of said seat shell, a retaining member adapted to reside in said inner portion of said seat shell and engage said legs of said female fastener thereby preventing said female fastener from being pulled out of said seat shell aperture, said retaining member allowing said female fastener to move along said first axis, whereby when said seat insert is placed adjacent said seat shell and said elongated body portion of said stud fastener is passed through said female fastener aperture and between said resilient legs, and whereby any substantial imbalance along said first axis between said resilient forces of said legs against said stud body will cause said female fastener to move along said first axis in a direction which substantially balances the resilient forces exerted by said legs on said stud body, thereby aligning said female member with said male member, and whereby said engagement of said legs and said stud body acts to fasten to said seat insert to said seat shell.

7. The seat insert fastening system of claim 6, wherein said retaining member comprises a retaining clip, and wherein said resilient legs of said female fastener include a clip engaging finger, said engaging finger adapted to engage a surface of said retaining clip thereby urging said retaining clip against said inner surface of said seat shell when said female fastener is withdrawn from said seat shell aperture.

8. The seat insert fastening system of claim 7, wherein said retaining clips includes urging means for urging said head of said female fastener against said engaging surface of said seat shell.

9. The seat insert fastening system of claim 6, wherein said stud fastener is threaded and threadedly attached to said seat insert.

10. The seat insert fastening system of claim 6, wherein said body of said stud fastener is rippled, and said resilient legs of said female fastener include a contoured surface adapted to cooperatively engage a portion of said ripples.

11. The seat insert fastening system of claim 6, wherein each said resilient leg includes a curvalinear stud engaging surface, each said curvalinear surface having a longitudinal axis generally perpendicular to said first axis, and parallel to a longitudinal axis of another one of said resilient legs, said linear extending surfaces allowing said stud to be inserted between said linear surfaces anywhere along the length of said surfaces, thereby accommodating misalignment between said stud fastener and said female fastener along the longitudinal axes of said stud engaging surfaces.

* * * * *

UNITED STATES PATENT AND TRADEMARK OFFICE
CERTIFICATE OF CORRECTION

PATENT NO. : 5,152,582

DATED : October 6, 1992

INVENTOR(S) : Magnuson

It is certified that error appears in the above-identified patent and that said Letters Patent is hereby corrected as shown below:

```
Col. 10, line 6, "into" should read "of".
Col. 10, line 2, "bear" should read "bare".
```

Signed and Sealed this

Seventh Day of December, 1993

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,152,582
DATED : October 6, 1992
INVENTOR(S) : Magnuson

It is certified that error appears in the above-identified patent and that said Letters Patent is hereby corrected as shown below:

Column 7,
Lines 14 and 15, change "curvalinear" to -- curvilinear -- (both occasions).

Column 8,
Line 55, change "2" to -- 12 --, and change "chain" to -- chair --.

Column 10,
Line 6, "into" should read -- of --.
Line 34, change "male" to -- stud --.

Column 11,
Lines 35 and 36, delete "and whereby".

Column 12,
Line 3, change "member" to -- fastener --, and change "male" to -- stud --.
Line 5, change "to" (first occurrence).
Line 16, change "clips" to -- clip --.
Lines 28 and 29, change "curvalinear" to -- curvilinear --.
Line 34, change "linear" to -- curvilinear --.

This certificate supersedes Certificate of Correction issued December 7, 1993.

Signed and Sealed this

Thirtieth Day of November, 2004

JON W. DUDAS
*Director of the United States Patent and Trademark Office*